2,713,973

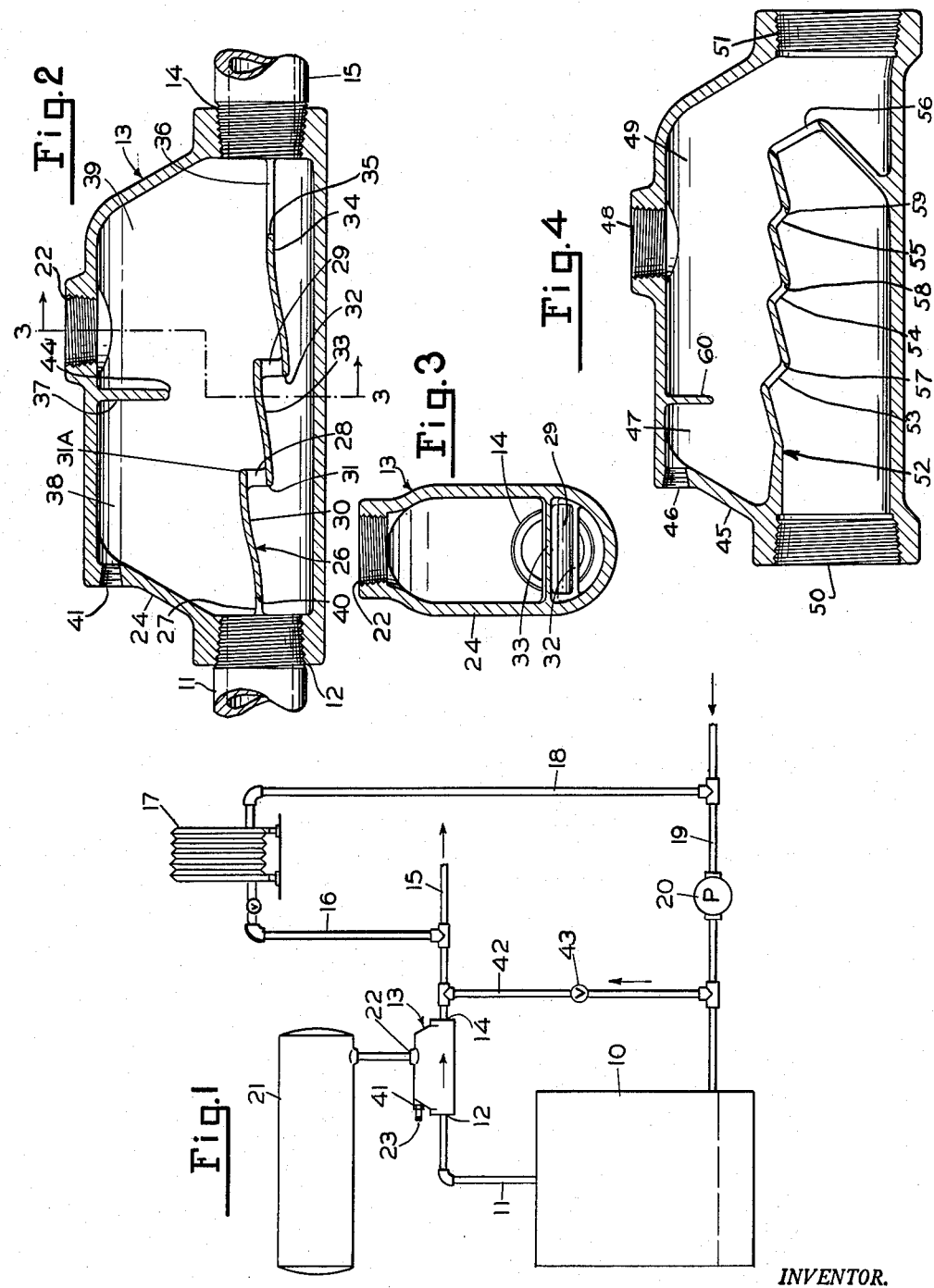
July 26, 1955    H. G. HENCKEN ET AL    2,713,973
HEATING SYSTEMS
Filed June 20, 1951
INVENTOR.
HAROLD G. HENCKEN
BY RUDOLPH T. SCHOERNER
Pollard and Johnston
ATTORNEYS

United States Patent Office 2,713,973
Patented July 26, 1955

HEATING SYSTEMS

Harold G. Hencken, Greenwich, Conn., and Rudolph T. Schoerner, Oaklawn, R. I., assignors to Taco Heaters, Incorporated, Providence, R. I., a corporation of New York Application June 20, 1951, Serial No. 232,522

10 Claims. (Cl. 237—63)

This invention relates to heating systems and more particularly to a closed hot water heating system wherein it is desirable to provide means for removing air from the system.

Closed hot water heating systems normally include a boiler for heating water, the boiler being connected by suitable piping to the space heat transfer or radiating means. The radiating means can be connected with a boiler return pipe system. Preferably, a water circulating means, such as a pump, is included in the return pipe to the boiler. Air which is liberated from the water in the boiler because the higher the temperature of the water, the less dissolved air it can hold, then may find its way into the system. When this occurs, it becomes trapped in the radiators so as to prevent water from occupying the entire space within the radiator and this will prevent proper heat emission by the radiating means.

One of the objects of the present invention is to provide an improved air removal means especially adapted for use in a closed hot water heating system or the like.

Another of the objects of the invention is to provide an improved closed hot water heating system.

In one aspect of the invention, an air removal chamber can be provided for use in a closed hot water heating system, the chamber being located in the supply line leading from the boiler to the radiators in the spaces to be heated. The air removal chamber can have inlet and outlet apertures therein with guide or baffle means interposed directly in the line of water flow through the chamber, a portion thereof dividing the waterflow in the chamber. As water flows in horizontal runs of pipe, the air bubbles appear to tend to rise to the top thereof. The baffle means can be arranged substantially horizontally so that the air bubbles in the flowing water will be stripped from the upper part of the main water stream and will be directed toward the upper part of the chamber, the deaerated water flowing toward the outlet of the chamber. The deaerated water is guided so as to maintain its velocity as it moves toward the outlet. The water containing air which is stripped off is directed to a portion of the chamber having a larger volume so that its velocity is reduced and this permits the air to separate. An expansion tank can be connected to the top of the chamber for receiving the removed air.

In a preferred embodiment, a vertically extending plate can be located across the top of the chamber so as to separate the top portion above the baffle into two compartments or zones. The first zone, or the one near the inlet, can be connected with an air removal valve, for example, an automatic air venting means. The zone near the outlet, which can be termed the second zone, can have a connection at the top thereof to the expansion tank or to other air receiving or removal means.

As water flows through the chamber, the larger air bubbles may be separated by the leading part of the baffle so as to collect it in the first zone from which it can be vented. The smaller air bubbles carried along with the water will be stripped off and directed to the second zone and thus will pass into the expansion tank. The stripping off may occur at the leading edge of the baffle or may be at one of the succeeding apertures in the baffle. When the air in the expansion tank is such as to force the level of water in the second zone below the vertically extending plate, the air will pass to the first zone from which it can be vented. When water is not flowing, air will tend to pass from the boiler to the chamber and will be vented therefrom.

These and other objects, advantages and features of the invention will become apparent from the following description and drawing which are merely exemplary.

In the drawing:

Fig. 1 is a schematic view of one form of heating system with which the invention may be used;

Fig. 2 is an enlarged sectional view of the air removal chamber;

Fig. 3 is a sectional view taken along the line 3—3 of Fig. 2;

Fig. 4 is an enlarged sectional view of a modified form of the invention.

The invention will be described in conjunction with a conventional closed hot water heating system, one form of which is illustrated in Fig. 1. Boiler 10 has a supply pipe 11 which is connected to inlet aperture 12 of the air removal chamber which is indicated generally by 13, the outlet aperture 14 of air removal chamber 13 being connected to the main system feed pipe 15. Preferably, the inlet and outlet apertures are approximately horizontal relative to each other. Main feed pipe 15 has connections, such as 16, with the various heat transfer means or radiators 17. Radiators 17 can have a return line 18 connected to the main return line 19, although such is not entirely necessary.

As is known in the art, circulating pump 20 can be connected to boiler 10, the pump 20 being controlled by a thermostat placed in an appropriate location. When the thermostat calls for heat, the pump will operate to circulate water to the various radiators. A conventional bypass 42 with a valve 43 therein may be provided between the main system feed line 15 and return line 19. The invention also can be applied to a system wherein the circulating pump has been omitted.

Expansion tank 21 is connected with the expansion tank aperture 22 of the air removal chamber 13. By use of the invention described herein, the air removal chamber can be located close to the expansion tank. Preferably, the pipe between the expansion tank and the removal chamber should be as short as possible. Such will permit water and air to flow counter to each other therein, which is not possible where long runs of small diameter pipe are involved. An air release or vent valve 23 can be connected with air release valve aperture 41 of the air removal chamber 13. The air vent valve 23 may be automatically operated and may be, for example, of the type illustrated in Patent No. 2,601,216, issued June 17, 1952. It is to be understood that the air vent valve and expansion tank connections can be reversed.

Air removal chamber 13 may comprise a shell 24 having a generally horizontally extending baffle arrangement 26, the space above said baffle in the chamber having considerably more volume than that below the baffle. In its preferred form, baffle arrangement 26 has a series of air stripping apertures or openings, 27, 28, 29 and 36 therein. At the entrance of the air removal chamber 13, baffle 26 preferably is located adjacent the center line of inlet aperture 12 so that regardless of pipe size and interior diameter of the connecting pipe 11, leading edge 40 of the baffle will be interposed directly in the liquid flow. It is desirable not to disturb the relatively lamellar flow of the lower layer of water in the chamber. In the event that the air stripping apertures 28 and 29, spaced from the entrance of the chamber, are adequate to strip the water carrying air from the water stream, then the leading edge of the baffle means may be placed nearer the top of the inlet aperture or may be located so that it is not directly in the flow stream at this point. It has been found, however, that it is preferable to place the baffle as illustrated in order to avoid turbulence and so as to facilitate air removal. Also, when the baffle is placed adjacent the center of inlet aperture 12, the pipe wall thickness will not affect operation.

Edges 31 and 32 of the baffle 26 are directly in the flow stream, upper face 30 leading to aperture 28 terminating at edge 31A, the edge 31A being vertically spaced relative to leading edge 31 of the face 33 of the baffle means. As the water with air therein moves into the upper part of the chamber, its velocity is slowed so that it can rise.

Air stripping aperture 29 is formed similar to air stripping aperture 28. Baffle face 34 terminates at 35 leaving an aperture 36 through which the water flows to the outlet aperture 14 and then to the system. It can be seen that the air stripping apertures divide the water with air therein from the water stream passing along the bottom of the chamber.

In the upper part of the air removal chamber, a separating plate or baffle 37 is arranged transversely of the chamber and depends from the top wall thereof, plate 37 being vertical and dividing the interior of the upper part of the chamber into a first compartment or zone 38 and a second compartment or zone 39. The lower edge 44 of the plate 37 is spaced above baffle means 26.

As water flows through inlet aperture 12, the larger bubbles of air will move upwardly into the first zone 38 where the air can be vented by a valve 23 (Fig. 1) connected to aperture 41. The water passing below the leading edge 40 of baffle 26 will flow toward the outlet aperture. The water with smaller bubbles of air therein will tend to follow the lower part of upper face 30 of the baffle until they enter air stripping aperture 28 from where they will be directed toward the zone 39. The remainder of the water will continue to flow toward the second baffle or air stripping aperture 29 and water with air bubbles will be stripped toward second zone 39 in a manner similar to that described for aperture 29. The remaining water will continue its uninterrupted flow through the outlet aperture 14 to the system, any remaining bubbles possibly moving upwardly into zone 39 from trailing edge 35.

When the air in the expansion tank is sufficient so that chamber 39 will fill with air and depress the liquid level below the lower edge 44 of plate 37, air then will flow therefrom into zone 38 and will be vented to the atmosphere through the air vent valve 23.

A modified form of baffle arrangement is illustrated in Fig. 4 wherein shell 45 can have connections to the heating system similar to Figs. 1 to 3 inclusive. Aperture 46 may be connected to the first zone or compartment 47 and with an automatic vent valve such as seen at 23 in Fig. 1. Aperture 48 can be connected with an expansion tank such as 21 and with the second zone or compartment 49. Vertically extending plate 60 serves to separate zones 47 and 49. Inlet aperture 50 and outlet aperture 51 are similar to 12 and 14 respectively of Fig. 2. Baffle 52 has apertures 53, 54, 55 and 56 therein. Leading edges 57, 58 and 59 of apertures 53, 54 and 55 respectively are directly in the flow of water through the chamber and operate to strip off the air in a manner similar to that described for the previous form.

It is to be understood that various means can be employed for removing air from the top of the chambers and that one or two zones could be used. The baffle plate and apertures should be arranged so as not to disturb the water not having air therein as it passes toward the outlet aperture. Various details can be varied without departing from the spirit of the invention except as defined in the appended claims.

What is claimed is:

1. In a hot water heating system having heat transfer devices therein, the combination including a boiler, an expansion tank, a circulating pump in the system, supply pipe means leading from said boiler to said devices, an air removal chamber in said supply pipe means, a baffle means interposed in the path of water flowing through said chamber and in line therewith, said baffle means having apertures therein dividing the waterflow and stripping off water with air from the water flowing through said chamber and directing said air toward the top of said chamber, a transverse plate means extending downwardly from the top of said chamber and separating it into two upper zones, said plate means being spaced above said baffle means, means connecting said expansion tank to one of said zones, and means connecting an air release valve to the other of said zones.

2. In an air removal means for a hot water heating system having means circulating water in the system, the combination comprising a chamber having inlet and outlet water apertures at spaced points in said chamber, said inlet aperture receiving water circulated in said system, air passage means adjacent the top of said chamber, and a substantially horizontally extending baffle plate means having aperture means with edge means extending in the path of water flowing substantially horizontally through said chamber from said system, said baffle plate and aperture means dividing the stream of water flowing therethrough into at least two streams and directing air as it separates from the upper part thereof toward the upper part of said chamber.

3. In an air removal means for use in the pipe line from the boiler for a hot water heating system having means circulating water in the system, the combination comprising a chamber having substantially horizontally spaced inlet and outlet apertures between which water can flow, and substantially horizontal baffle means extending across said chamber between said apertures and in line with the substantially horizontal water path therein, said baffle means having apertures with downwardly extending scoop-like edges extending into the path of said water for stripping off water with air from water flowing therethrough and directing the air as it separates from the water toward the top of said chamber.

4. In an air removal means for hot water heating systems or the like having means circulating water in the system, the combination comprising a body defining a chamber, said chamber having horizontally spaced inlet and outlet means between which water can flow, substantially horizontal baffle means extending in line with said inlet and outlet means for directing the substantially horizontal flow of water therebetween, said baffle having aperture means with scoop-like edges extending downwardly directly into the water flow path, said edges dividing the flow into at least two streams, said scoop-like edges stripping off water with entrapped air and directing the air as it separates from the water toward the top of said chamber.

5. In an air removal means for use in the pipe line from the boiler for a hot water heating system having means circulating water in the system, the combination comprising a chamber having substantially horizontally spaced inlet and outlet apertures between which water can flow, and substantially horizontal baffle means extending across said chamber between said apertures and in line with the substantially horizontal water path therein, said baffle means having apertures with scoop-like edges extending downwardly into the water path for stripping off water with air from water flowing therethrough and directing the air toward the top of said chamber as the air separates from the water, the leading edge of said baffle means being spaced below the upper margin of the inlet aperture so as to divide the flow.

6. In an air removal means for hot water heating systems or the like having means circulating water therethrough the combination including a body defining a chamber, said chamber having horizontally spaced and aligned inlet and outlet means between which water can flow in a substantially horizontal path, substantially horizontal baffle means extending in line with said inlet and outlet means for directing the flow of water therebetween, the leading edge of said baffle means being located approximately at the middle of the inlet means aperture, said baffle means having scoop-like edges extending downwardly into the water flow path, said scoop-like edges stripping off water with entrapped air and directing it toward the top of said chamber as the air is separated from the water.

7. In an air removal means for use in the pipe line from the boiler for a hot water heating system through which water is circulated, a chamber having substantially horizontally spaced inlet and outlet apertures between which water can flow in a substantially horizontal path, said inlet receiving water to be circulated, baffle means extending across said chamber between said apertures and in line with the water path therein, said baffle means having scoop-like edge means extending into the water path for stripping off water with air from water flowing therethrough and directing the air toward the top of said chamber, transversely located plate means depending from the top of said chamber and spaced above said baffle means, said plate separating the upper part of the chamber into two zones, the zones having air passages connected therewith.

8. In an air removal means for hot water heating systems and the like having means for circulating water therein, the combination including a shell defining a chamber, said chamber having horizontally spaced inlet and outlet apertures, said inlet aperture receiving water to be circulated in said system, a substantially horizontal baffle plate located across said chamber between said inlet and outlet apertures and defining a substantially horizontal path for water flow therebetween, said baffle plate having apertures therein, said apertures having one margin in the form of lips extending downwardly into the path of water flow with a margin spaced above said lip defining the aperture therebetween, and a plate extending downwardly from the top of said chamber wall and transverse to said path of water flow, said plate being spaced above said baffle and separating the top of the chamber into a first and second compartment, and air removal connections to both of said compartments.

9. In an air removal means for hot water heating systems and the like having means for circulating water therein, the combination including a shell defining a chamber, said chamber having horizontally spaced inlet and outlet apertures, said inlet receiving circulated water of said system, a substantially horizontal baffle plate located across said chamber between said inlet and outlet apertures and defining a substantially horizontal path of water flow therebetween, said baffle plate having apertures therein, said apertures having one margin in the form of lips extending into the path of water flow with a margin spaced above said lip defining the aperture therebetween, the chamber above said baffle plate having more volume than that below it, and a plate extending downwardly from the top of the chamber wall and transverse relative to said path of water flow, said plate being spaced above said baffle and separating the top of the chamber into a first and second compartment, and air removal connections to both of said compartments.

10. In an air removal means for a hot water heating system having means circulating water therein, the combination comprising a chamber having inlet and outlet apertures, said inlet aperture being connected to said system for directing circulated water through said chamber in a substantially horizontal path, an air passage adjacent the top of said chamber, and a substantially horizontally extending baffle plate means having edge means located in line with said substantially horizontal path of water therethrough and below the top of said inlet aperture dividing said water into at least two streams, the upper stream carrying the air therewith toward said air passage and directing said air in the water to said air passage as it is liberated from said water.

References Cited in the file of this patent

UNITED STATES PATENTS

| | | |
|---|---|---|
| 1,708,021 | Lenz et al. | Apr. 9, 1929 |
| 1,931,419 | Thrush | Oct. 17, 1933 |
| 2,349,944 | Dixon | May 30, 1944 |
| 2,434,596 | Spieth | Jan. 13, 1948 |
| 2,578,568 | Mayer et al. | Dec. 11, 1951 |
| 2,614,648 | Wilson | Oct. 21, 1952 |

FOREIGN PATENTS

| | | |
|---|---|---|
| 451,905 | Great Britain | Aug. 13, 1936 |